Nov. 22, 1932.  G. A. F. WINCKLER  1,888,341
COMPOSITE SILICA ARTICLE
Filed Nov. 6, 1930
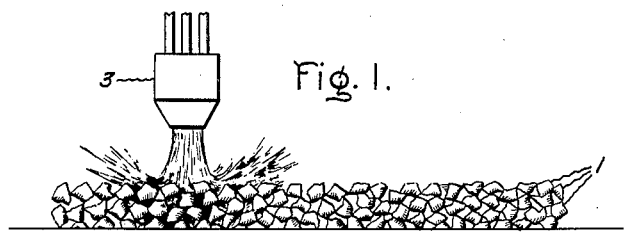
Fig. 1.
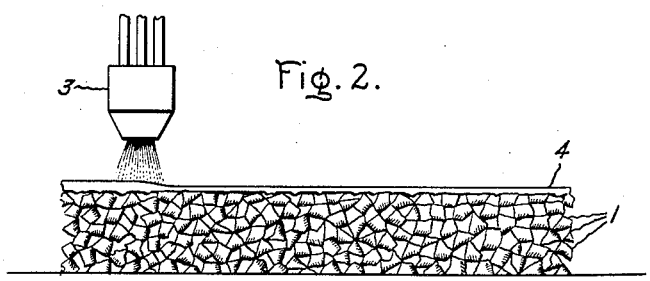
Fig. 2.
Fig. 3.
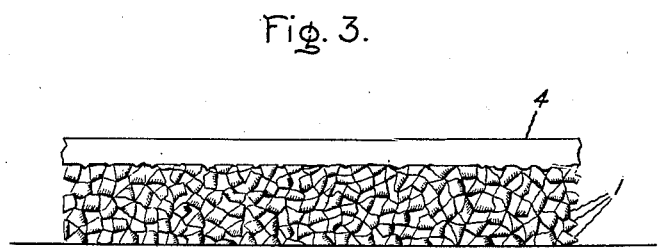
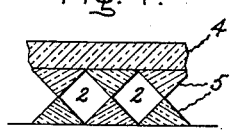
Fig. 4.
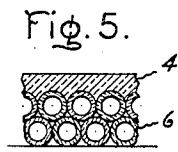
Fig. 5.
Inventor:
Gunnar A. F. Winckler,
by Charles E. Tullar
His Attorney Patented Nov. 22, 1932

1,888,341

UNITED STATES PATENT OFFICE

GUNNAR A. F. WINCKLER, OF WORCESTER, MASSACHUSETTS, ASSIGNOR TO GENERAL ELECTRIC COMPANY, A CORPORATION OF NEW YORK

COMPOSITE SILICA ARTICLE

Application filed November 6, 1930. Serial No. 493,837.

The present invention relates to the construction of silica articles, such as for example, astronomical mirrors, and it is the object of my invention to provide a construction of lighter weight, improved homogeneity and lesser cost for articles of this character as heretofore produced.

Mirrors for large astronomical telescopes heretofore have been made by providing a relatively thick plate of crude, opaque silica with a thin facing layer of high grade clear silica which is given a desired configuration and is provided with a silvered, light-reflecting surface.

The fabrication of such a backing plate becomes increasingly difficult with an increase in size of the article. They are made by heating any convenient finely divided form of silica, for example, sand or crushed quartz, in a furnace to the fusion temperature of silica in order to cause consolidation of the silica particles. When the size of the desired article exceeds several feet in diameter, the necessity for providing suitable refractory moulds for holding the comminuted silica, during fusion, the necessity for providing sufficiently large furnaces for heating the entire mass to the required high temperature and for a large input of electric energy required for such furnace makes the fabrication of such silica articles extremely arduous and expensive. In fact, there are practical limits beyond which for economic reasons the size of such articles can not be extended.

As a consequence of my invention, I have provided silica articles of lesser weight suitable for use in the construction of large astronomical mirrors without requiring expensive moulds, large furnaces and a high electric power input.

In accordance with my invention, plates, or similar articles, are made by uniting, by localized fusion, fragments of previously fused, or vitreous silica having such shape that numerous cavities of substantial size will be enclosed by such united fragments. The heat required for uniting contacting edges and corners of such fragments is applied locally, preferably by means of a high temperature gas flame which is caused to play upon the mass of assembled fragments and is traversed from one region to another as fast as the welding of the fragments to one another proceeds. The fragments remain unfused as a whole and are joined to one another only at isolated regions of contact. The voids or enclosed spaces constitute a large fraction of the total volume of the whole.

Upon the cellular article thus produced a layer of high grade homogeneous silica may be applied, for example, by spraying powdered silica thereon through a flame, or in any other convenient manner.

My improved article and process will be described with greater particularity in connection with the accompanying drawing in which Fig. 1 shows in side elevation the initial formation of a plate or disc from fragments of silica; in Fig. 2 is shown also in side elevation the deposition of a homogeneous clear layer of silica; Fig. 3 is a side elevation of a completed article; and Figs. 4 and 5 are fragmental views illustrating modifications.

In carrying out my invention, the angular fragments 1 of previously fused silica of relatively large size, say about ½ to 2 inches in diameter or thereabouts, are assembled as shown in Fig. 1 leaving relatively large spaces between the assembled fragments. These fragments may consist of clear translucent or opaque silica as may be desired.

A thickness of two or three layers may be built up as shown. A high temperature flame, as for example a flame of combustible gas such as hydrogen and a combustion supporting gas, preferably oxygen, is played upon the fragments in a suitable burner 3, having ducts for feeding gases and comminuted silica as indicated. This causes incipient fusion or softening of the silica fragments at the edges and corners without fusing the fragments as a whole. I find that under these conditions the entire mass of fragments can be caused to unite to form a unitary article without such coalescence of the particles as would eliminate the spaces between the fragments. The spaces differ from the bubbles sometimes found in fused silica by being larger in size, being non-spherical and by having walls consisting in part at least of angular surfaces. Additional layers are built up upon the foundation thus produced until a plate or disc of the required thickness is made.

After a plate of required configuration has been made it may be trimmed by cutting or grinding away any protruding fragments and a layer of silica which is homogeneous and largely free from cavities is then deposited upon its surface by spraying finely divided silica through a high temperature burner as is somewhat diagrammatically illustrated in Fig. 2. This forms a homogeneous clear layer 4 of clear silica upon the surface of the united mass of fragments.

A process of spraying finely divided silica upon a foundation through a flame and an article produced thereby is described and claimed in an application filed by Berthold F. Niedergesass, United States Patent 1,869,163 patented July 26, 1932. Also, in a copending application Serial No. 453,362, filed by myself and Alvarado L. Ellis, (British Patent 364,993) an improved process and apparatus for fabricating silica bodies by spraying is described and claimed.

As both the backing layer consisting of fragments 1 and the finishing layer 4 are made of the same material they have the same coefficient of expansion and thus will remain united to form a unitary article when cooled from the temperature of fabrication to room temperature. The superficial layer of clear homogeneous quartz may be built up to any required thickness by repeatedly traversing over it the flame and continuing the spraying and incorporation by fusion of the silica powder.

In Fig. 3 is shown an article in which the layer 4 of clear homogeneous silica has been made relatively thick by the repeated deposition of silica through a flame in the manner described in Fig. 2.

While the fragments employed in the structures shown in Figs. 1 to 3 are of irregular shape, they may be made of regular geometric shape as shown in Fig. 4. The silica pieces 5 are of pyramidal shape and are joined to one another at their edges, leaving spaces 2 of the same order of magnitude as the pieces themselves.

Units of various other geometric shape including hollow bodies, may be joined together. Fig. 5 for example shows tubes 6 of silica joined together to form a unitary structure containing relatively large cavities.

The advantages of my invention lie not only in the lighter weight of the completed structure and its lower cost, but also in the readiness with which greater chemical purity is preserved in the silica. When sand is employed as a raw material for a backing plate high chemical purity is not to be expected.

When massive crystalline quartz of greater purity than sand is employed it must be crushed in metallic crushing devices and particles of abraded metal become mixed with the resulting silica powder. It is extremely difficult to remove such fine metal distributed in a fine quartz powder. Impurities in powdered silica are apt to cause inequalities in thermal expansion and cracking of the completed structure. When using relatively large unit pieces in accordance with my invention high purity of the silica can be easily maintained and cracking avoided.

What I claim as new and desire to secure by Letters Patent of the United States, is:

1. An article of manufacture comprising a support constituted of angular pieces of vitreous silica united with one another at isolated regions of contact only, and having spaces therebetween which constitute a large fraction of the total volume of said support and a layer of substantially cavity-free silica united with said support.

2. An article of manufacture comprising irregular fragments of silica of dimensions of about one-half to two inches united with one another at regions of contact so as to enclose irregular spaces of substantially the same order of magnitude as said fragments and a mass formed by the accretion by fusion of finely divided silica united with said fragments.

3. An article of manufacture comprising fragments of silica united with one another at isolated regions of contact only, leaving voids forming a substantial part of the total volume of said article, and a homogeneous layer of silica united by fusion with said fragments.

4. An article of manufacture comprising units of silica of angular configuration and of a size within a range of about one-half to two inches joined to one another, said article having relatively large cavities distributed throughout its mass, and a homogeneous layer of silica united therewith.

In witness whereof I have hereunto set my hand this 3rd day of November 1930.

GUNNAR A. F. WINCKLER.